April 22, 1969
G. B. BUSH
3,440,426
SOLAR ATTITUDE ENCODER
Filed Jan. 11, 1966
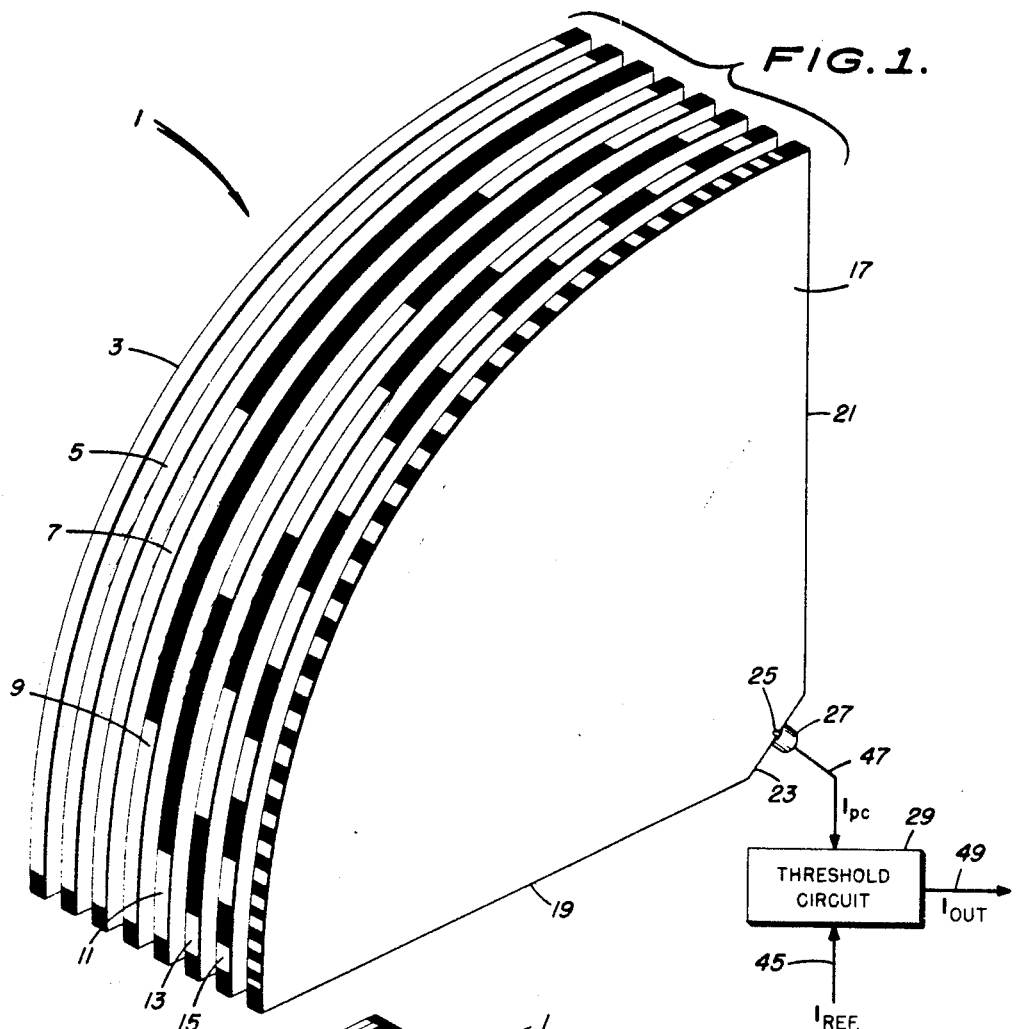
FIG.1.
FIG.3.
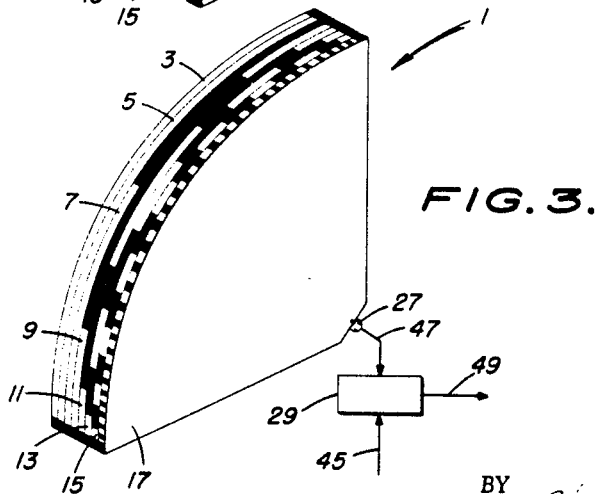
INVENTOR
GEORGE B. BUSH
BY Claude Funkhouser
ATTORNEY

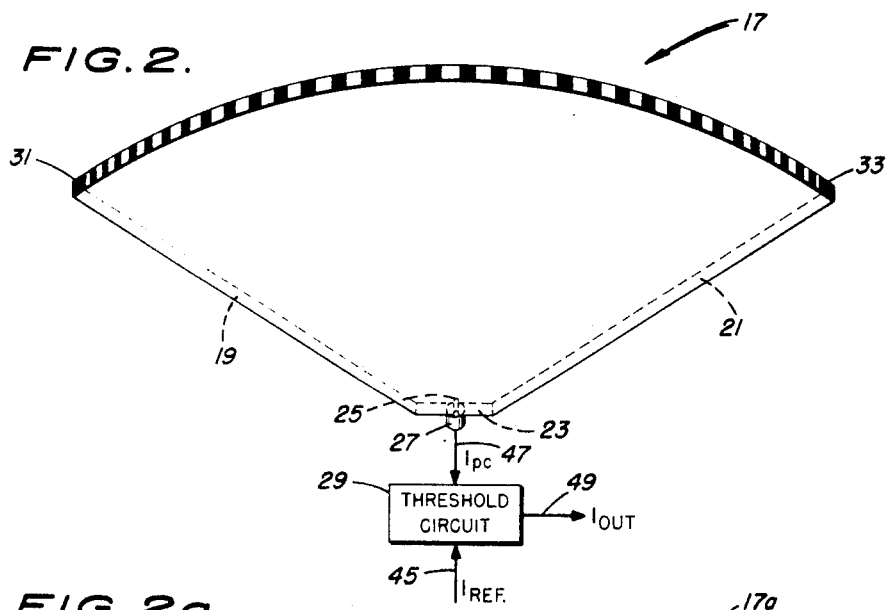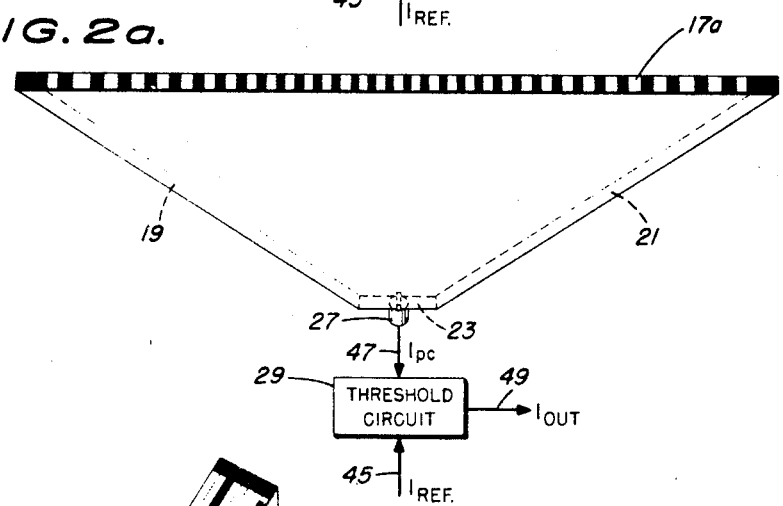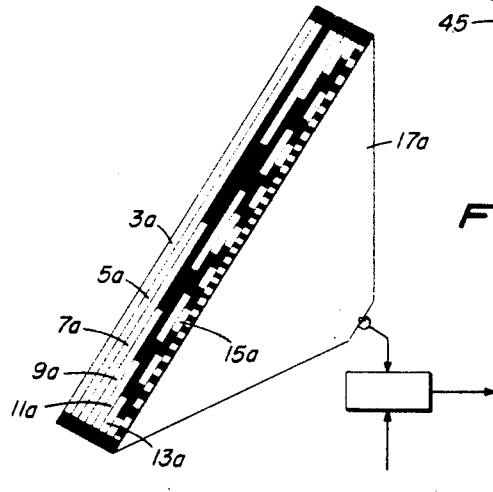

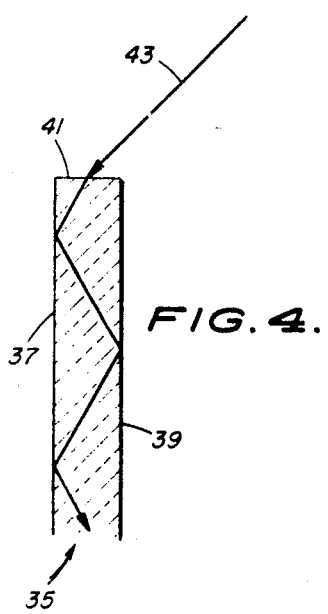
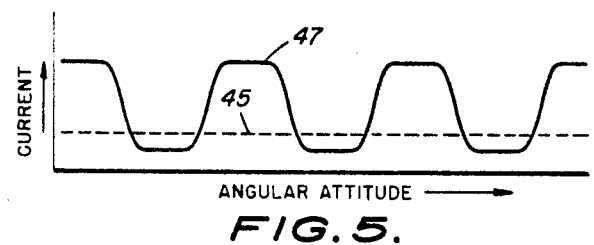
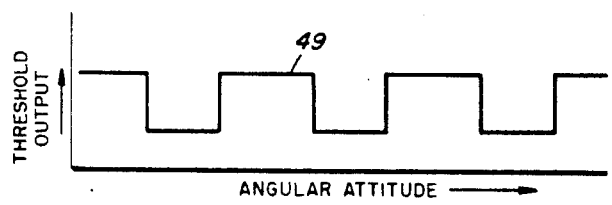
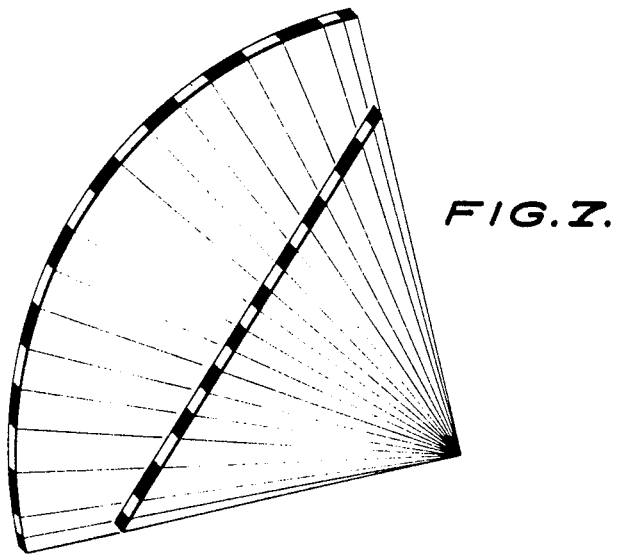
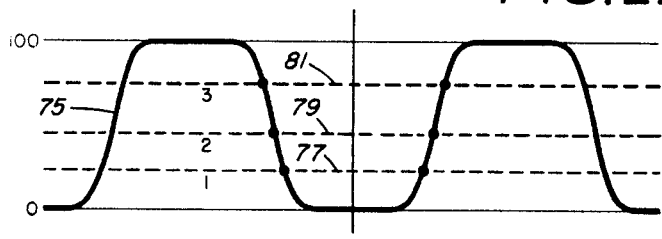

SCHEMATIC OF THE ATTITUDE ENCODERS AND
THEIR ASSOCIATED THRESHOLD CIRCUITS IN
ANY OF THREE EFFECTIVE PLANES

INVENTOR
GEORGE B. BUSH

April 22, 1969 G. B. BUSH 3,440,426
SOLAR ATTITUDE ENCODER
Filed Jan. 11, 1966
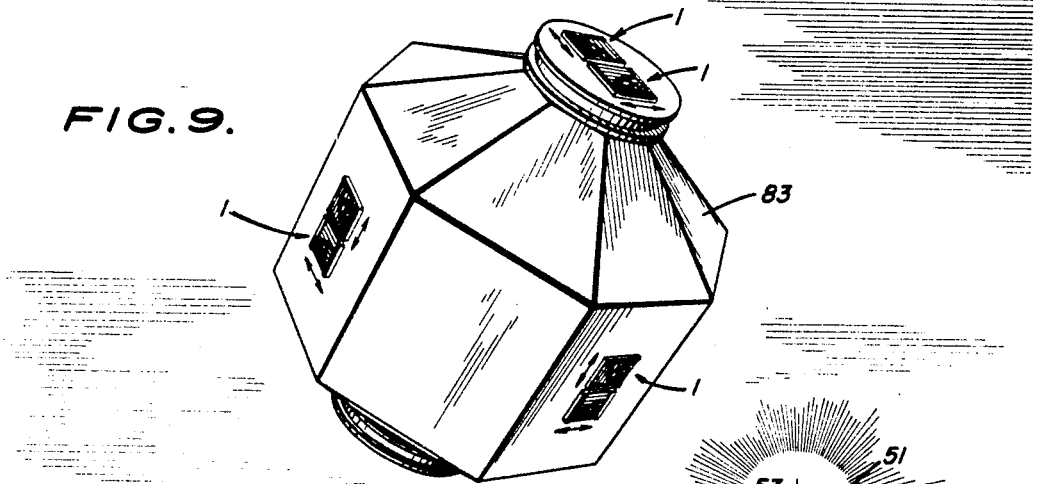
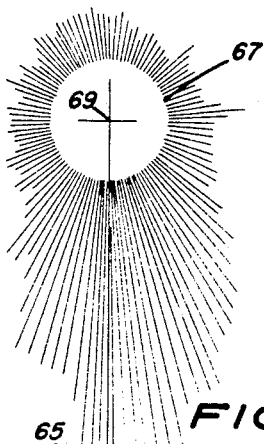
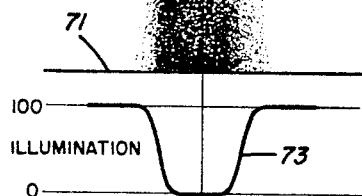
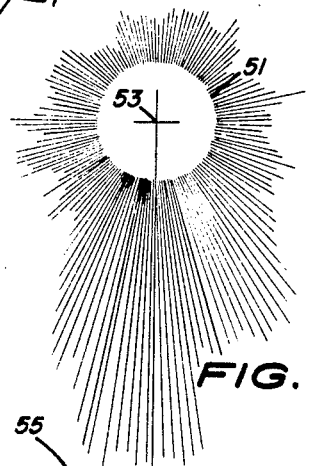
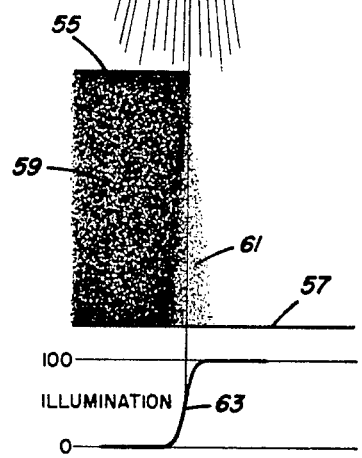
INVENTOR
GEORGE B. BUSH
BY Clarke Funkhouser
ATTORNEY

United States Patent Office 3,440,426
Patented Apr. 22, 1969

3,440,426
SOLAR ATTITUDE ENCODER
George B. Bush, Clarksville, Md., assignor to the United States of America as represented by the Secretary of the Navy
Filed Jan. 11, 1966, Ser. No. 520,309
Int. Cl. H01j 39/12
U.S. Cl. 250—209        19 Claims

ABSTRACT OF THE DISCLOSURE

The present invention relates to apparatus for detecting the relative attitude of a satellite with respect to the sun and comprises a plurality of masked precision angle sensing elements mounted on a satellite in three mutually perpendicular planes; a plurality of solar cells each attached to one of said precision angle sensing elements for receiving cyclical illumination and for converting said illumination to electrical energy; means connected to each of said solar cells for comparing the cell outputs with a reference signal level and providing an output signal dependent upon this comparison; and a plurality of mask-coded optical sensing elements for identifying which of the said masks on said precision angle sensing elements caused a particular one of said cyclical illuminations.

---

This invention relates generally to goniometers and more specifically to an improved solar attitude encoder.

Modern technology has seen many advances in recent years. One of the most significant advances has been the development of satellites. It was inevitable that the development of satellites would foster much invention, as orbiting satellites present unique environmental problems which engender novel and sophisticated solutions. One of the most significant problems to present itself in recent years has been the development of means for accurately determining the attitude of an orbiting satellite with respect to the sun.

The present invention was developed in response to the above problem and provides a novel solution thereto through the separation of the functions of accuracy and identification.

It is an object of this invention, therefore, to provide a solar attitude encoder for accurately measuring the attitude of an orbiting satellite with respect to the sun.

Another object of the present invention is to provide a solar attitude encoder for a satellite wherein variations in threshold signal level would have little effect on the goniometric process.

Still another object of the instant invention is to provide a solar attitude encoder for a satellite, wherein the adverse effects of earthshine will be minimal.

A further object of this invention is to provide, in a solar attitude encoder for satellites, means for minimizing the inaccuracies caused by cosine effects.

A still further object of the present invention is to provide a solar attitude encoder for satellites, including solar cells, wherein the effects of solar cell degradation will be relatively insignificant.

Yet another object of the instant invention is to provide a solar attitude encoder for measuring the attitude of an orbiting satellite relative to the sun, wherein the measuring process is independent of optical degradation.

Other objects and many of the attendant advantages of the present invention will be better appreciated and said invention will become clearly understood by reference to the following detailed description when considered in conjunction with the accompanying drawings illustrating two embodiments of the instant invention, wherein:

FIG. 1 is an exploded perspective of an attitude encoder quadrant of the present invention;

FIG. 2 is a perspective of a precision angle optical sensing element employed in the present device;

FIG. 2a is a perspective of an alternate form of the precision angle optical sensing element employed in the present device;

FIG. 3 is a perspective of an attitude encoder quadrant of the present invention;

FIG. 3a is a perspective of an alternate form of the device shown in FIG. 3;

FIG. 4 is a ray diagram illustrating the optical path through a single parallel plate optical sensing element;

FIG. 5 is a graphical illustration of photo current versus angular orientation of the solar attitude encoder with respect to the sun;

FIG. 6 is a graphical illustration of threshold circuit output current versus angular orientation of the solar attitude encoder with respect to the sun;

FIG. 7 is a perspective of two embodiments, of the masked surface, of an optical sensing element showing the relative mask spacing of a cylindrical masked surface and a planar masked surface;

FIG. 9 is a perspective of a satellite in orbit showing a plurality of solar attitude encoders mounted thereon;

FIG. 10 is a graphical representation of solar illumination of a surface when a large mask is partially interposed between the sun and said surface;

FIG. 11 is a graphical representation of solar illumination of a surface when a narrow mask is interposed between the sun and said surface; and FIG. 12 is a graph indicating a cyclical illumination function having a plurality of reference levels superimposed thereon.

Figure 8:
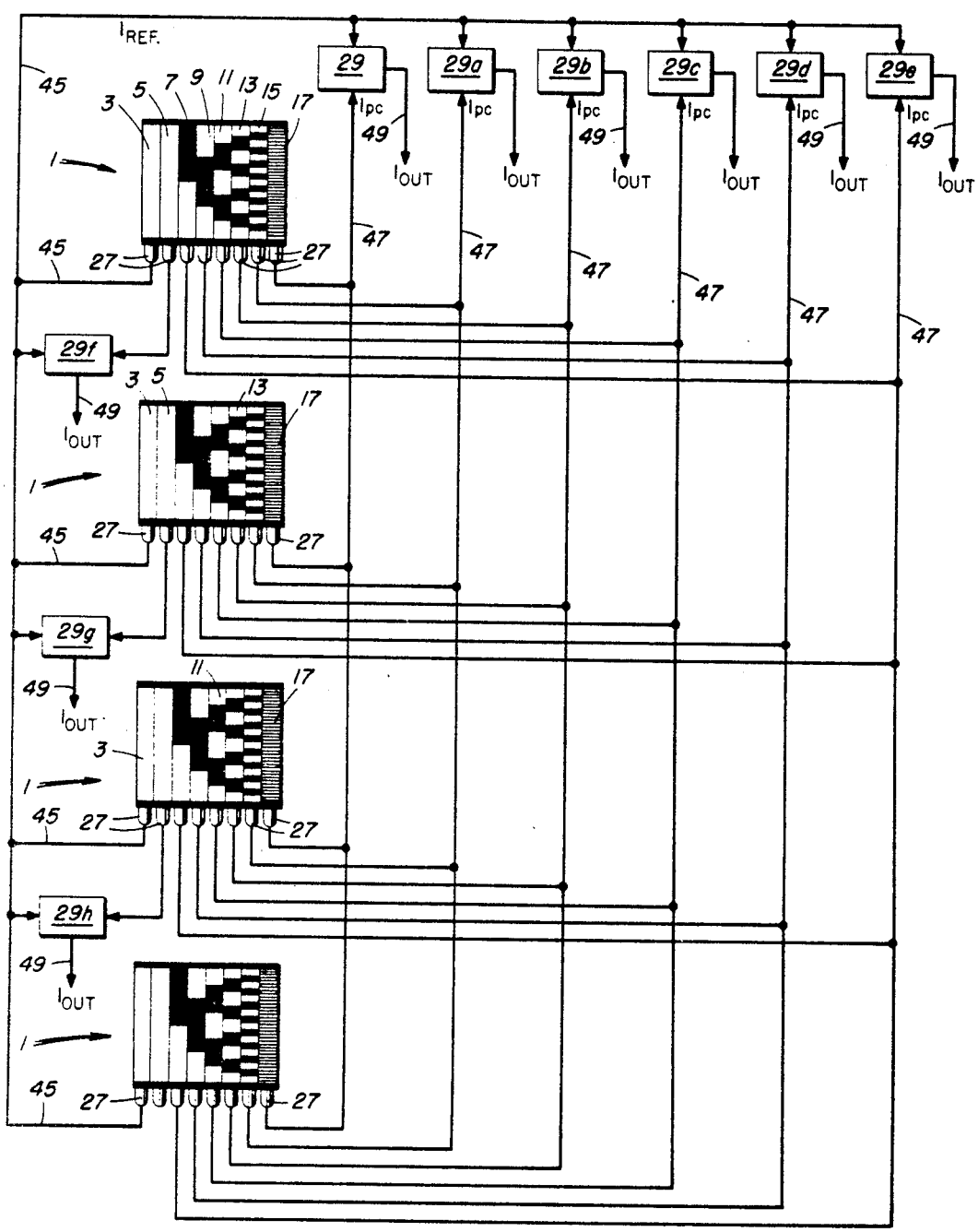
FIG. 8 is a simplified schematic of the electrical connections between each of the optical sensing elements of four optical quadrants in any single effective plane.

Referring now to the drawings, and more specifically to FIG. 1, a solar attitude encoder is shown at 1, including a plurality of optical sensing elements 3, 5, 7, 9, 11, 13, 15 and 17. Each of the optical sensing elements 3 through 17 is comprised of a quadrant of a right circular solid cylinder, and is constructed of a material such as fused quartz for the mitigation of radiation damage.

Each of the optical sensing elements 3 through 17 is of identical construction (except as will be pointed out hereinafter) so that a description of one will suffice for the others.

Unlike a true quadrant, the radial sides 19 and 21 of the sensing element 17 (FIGS. 1 and 2) do not meet so as to form an apex, but extend rearwardly to a planar surface 23 that is perpendicular to the radial axis of symmetry of said sensing element 17. A slit 25 is centrally located in the planar surface 23 and is parallel to the cylindrical axis of the sensing element 17.

A photocell 27 is placed over said slit 25 (in a well-known manner) so as to be able to receive light emanating therefrom, and is connected to a threshold circuit 29.

As best seen in FIG. 3, all of the optical sensing elements 3 through 17 are metalized and glued together, as by epoxy, one on top of the other so that their peripheral surfaces line up to form a single quadrant of a right circular cylinder. It is to be emphasized that each of the sensing elements 3 through 17 is connected to a separate photocell and a threshold circuit in the manner illustrated hereinabove for said sensing element 17.

Referring again to FIG. 2, it is seen that the cylindrical surface of the sensing element 17 is covered by a plurality of masks. In the example shown in the figure there are two reference masks 31 and 33, and 32 precision angle mark masks.

Like the sensing element 17 each of the sensing elements 3 through 15 is provided with two reference masks with one such mask at each end portion of the cylindrical surface of each of said sensing elements. The sensing elements 3 through 15 differ from the sensing element 17, and from each other, only by the number and lengths of the masked portions on their cylindrical surfaces. The masking of the sensing element conforms to the well-known "Gray code" sequence, and 12 solar attitude encoders are mounted upon a satellite in three mutually orthogonal planes with one encoder mounted in each of the quadrants in each of said three mutually orthogonal planes. Each of the solar attitude encoders is effectively a quadrant of a cylinder (as described hereinabove) and thus four such encoders, each of whose cylindrical surface covers 90 angular degrees of arc, provide coverage over an entire circle. The mounting of the solar attitude encoders, and their coverage, will be described in more detail hereinafter.

As the attitude of a satellite with respect to the sun changes in any of the three mutually orthogonal planes, the photocells, such as the photocell 27, attached to each of the sensing elements 3 through 17 will be cyclically illuminated through their respective slits, as the slit 25 in the sensing element 17. The cyclical illumination comes about from the fact that the sunlight reaching each slit will be periodically blocked off by the masked portions on the cylindrical surface of each of said sensing elements. That is, as the attitude of the satellite gradually changes, the line joining the sun and an exemplary photocell is periodically interrupted by the masked portions on the cylindrical surface; and therefore the photocell experiences cyclical illumination. This phenomenon is further explained with references to FIGS. 10 and 11.

The threshold circuits such as 29 compare the currents from their respective photocells, such as 27, with a reference level, and are well-known. If the photocell current exceeds the reference current then a positive going signal is issued by the threshold circuit 29. Conversely, if the reference current exceeds the photocell current then a negative going signal is issued by said threshold circuit 29.

It is readily seen from the above teachings that the instant device will provide coverage for positions of the sun in "apparent plane" of the solar attitude encoder quadrant 1. The term "apparent plane" is used because the sensing elements 3 through 17 obviously do not lie in a single plane but in spaced parallel planes. At a relatively large distance from the sun the sensing elements 3 through 17 will appear to lie in a single plane. The present invention will also provide coverage for positions of the sun removed from the plane of the quadrant 1, i.e., positions of the sun oblique to the "apparent plane" of the quadrants.

Referring now to FIG. 4, a ray diagram is illustrated for a position of the sun removed from the plane of the quadrant 1. A sensing element such as the sensing element 17 is shown at 35 in cross-section, including parallel faces 37 and 39, and cylindrical face 41. A ray 43 is shown entering the cylindrical surface 41 at an angle oblique to the cylindrical axis of said surface 41. It is seen from FIG. 4, that the incident ray will suffer internal reflection at the parallel surfaces 37 and 39 eventually reaching a photocell (not shown), such as the photocell 27 (FIGS. 1, 2, and 3). This internal reflection will occur at angles effectively past 45° from the "apparent plane" of the sensing element 35. However, cosine effects, and the effective mask width, limit 45° as a practical choice.

It was mentioned hereinabove that the photocells connected to each of the sensing elements 3 through 17 would be cyclically illuminated as the attitude of the satellite changed with respect to the sun. This cyclical illumination is best revealed in FIGS. 5 and 6.

Referring now to FIG. 5, a graph of photocurrent versus angular attitude with respect to the sun is shown for a sensing element, such as the sensing element 17, at 47 superimposed on a reference current level 45. As best seen in FIG. 6, the output current 49 of the threshold circuit 29 is positive going when the photocurrent 47 exceeds the reference current 45. The current 49 goes negative when the reference current 45 exceeds the photocurrent 47. It is clearly seen in FIG. 5 that the photocurrent minimum does not necessarily go to zero. This may be attributed to earthshine effects.

The sensing elements 17 serves to provide precision angle identification and includes 32 angle identification masks in addition to the two reference masks on its cylindrical surface. The width of the slit 25 together with the angle identification mask width is so chosen that when the center of the sun is in the direction defined by the slit center and the mask center, then no direct sunlight falls on the slit. Further, the widths of the slit and the angle identification masks are at the limiting values for the above conditions.

It was mentioned hereinabove that four solar atttitude encoder quadrants were placed in each of three mutually orthogonal planes to provide 360° of angular coverage within each of said planes. Therefore, there will be four sensing elements such as the sensing element 17 for precision angular identification within each of said planes. Thus, 128 precision angle identification masks will be provided for the full 360° of angular coverage in each of the three said mutually orthogonal planes. All of the angle identification masks are of the same width and are evenly spaced around the circumference of the cylindrical surface of the sensing elements such as the sensing element 17.

As mentioned supra, part of the novelty of the present invention resides in the separation of the functions of accuracy and identification, i.e., the identification or numbering of an angle is separated from the method and apparatus for obtaining high precision. Both of these functions depend on the simple shadowing geometry of a mask. As illustrated in FIG. 10, the sun is shown at 51, having its center at 53. A large mask 55 is partially interposed between the sun and a partially illuminated surface 57. A shadow region is formed on the surface 57 characterized by an umbra (not light) 59, and a penumbra (partially illumination) 61. The illumination across the shadow boundary is graphically indicated by a smoothly changing curve 63. It should be noted that the 50% illumination point occurs along a line defined by the sun's center 53 and the edge of the mask 55.

Referring now to FIG. 11, a narrow mask 65 is shown interposed between the sun 67, having its center at 69, and a surface 71. The illumination across the surface 71 is indicated by a smoothly changing curve 73. It can readily be seen that the illumination curve 73 is symmetrical about the line joining the sun's center 69 and the center of the mask 65.

If a series of narrow masks, such as the mask 65 (FIG. 11), are evenly disposed around a cylindrical surface with their lengths parallel to the cylindrical axis, and a slit and photo-cell are provided on the axis of the cylinder, a cyclical illumination function (photocell output) such as indicated in FIG 5 will be obtained. Each cyclic shadowing for angle changes around the cylindrical axis will be symmetrically located in exact correspondence to the angular position of the mask causing such cyclic shadowing.

Referring now to FIG. 12, a cyclical illumination function is shown at 75 having a plurality of threshold (reference) levels 77, 79, and 81 superimposed thereon. If the symmetry of the illumination function is perfect the threshold level 77, 79, or 81 at which a mask edge will be sensed may change without affecting the symmetry of the intercept points of the illumination function and the threshold level. Thus, it can be seen that the arithmetic means of said intercepts for a given mask is independent of the threshold level. To take advantage of this property it is necessary to preserve the pairs of data points (intercepts).

It is to be noted at this point that the times of occurrence for each change of state of the threshold circuit output current 49 (FIG. 6) are recorded and this information is telemetered to a ground station together with the signal 49. One method of obtaining the above time information is by utilizing a precision oscillator as the timing mechanism aboard a satellite. The angle information fed to the ground station is such that with the times of occurrence of the changes in state of the signal 49 recorded, the precision angle point will lie halfway between the up and down timed pairs. This precision angle mark process depends on the symmetry of the shadowing event, and is independent of the threshold level (reference level 45), cosine effects, solar cell degradation, optical degradation, etc., provided, however, that these changes occur slowly compared to the successive shadowing events.

To provide relatively accurate attitude information the timing accuracy for the most rapid angular rate needs to be appropriate. A magnetically oriented satellite will have a nominal angular rate of approximately .1 degree per second in the plane of the orbit. With a digital telemetry frame period of 1.3 seconds, a subframe timing using a three-bit counter dividing frame time into 8 intervals will provide a time accuracy of approximately .16 second or 1 minute of angle equivalent.

For a typical geometry of masking and theshold level choice to be used, the successive shadowing events will be about 28 seconds apart in time minimum. The pair of threshold crossings of each shadow event will be about 7 seconds apart. Eeach of the timing readings will be in a separate frame.

All of the precision angle mark events look alike. To provide identification of the individual precision angle mark events "Gray code" masking of the sensing elements 7 through 15 is employed (FIGS. 1 and 3). The masking for the "Gray code" is arranged so that the transitions in state occur between the precision angle mark mask points. Each of the 128 angle mark mask points (32 in each of 4 quadrants in a single plane) will have a distinct binary word identification. The sensing element 5 identifies the quadrant of the coverage circle (in a given plane) in which a particular precision angle mark mask (on the sensing element 17) lies. In a like manner the additional sensing elements 7 through 15 narrow the identification of any precision angle mark mask on the sensing element 17 successvely to which $\frac{1}{8}$, $\frac{1}{16}$, $\frac{1}{32}$, $\frac{1}{64}$, and $\frac{1}{128}$ of the coverage circle it lies in, respectively.

It was previously stated herein that each of the sensing elements 3 through 17 is connected to a separate photocell and a threshold circuit in the manner illustrated (FIGS. 1, 2 and 3) for the sensing element 17.

Referring again to FIG. 8, four optical quadrants 1, comprising a single coverage circle, are shown in block form. Each of said quadrants 1 includes the eight optical sensing elements 3, 5, 7, 9, 11, 13, 15 and 17. The sensing elements 7, 9, 11, 13, 15 and 17 all have partially masked surfaces, however, none of the sensing elements 3 and 5 in any of the quadrants (in any of the coverage circles) employ any masking other than reference masks.

The sensing elements 3, together with their associated photocells, serve to provide reference signals 45 to the threshold circuits such as 29. These reference signals, or threshold signals, are made to equal 50% of the output of the photocell associated with a fully illuminated sensing element 3 in a well-known manner, as by a common dividing network incorporated within each of the threshold networks such as 29. If it is assumed that the earth is of broad angular size then it can be shown that almost perfect compensation for earthshine effects will be obtained if the average masked area is 50% of the area of the masked surface of each of the optical sensing elements 7, 9, 11, 13, 15, and 17, and the electrical threshold signal is maintained at 50% of the signal output of the reference photocell (that photocell associated with the sensing element 3 under full solar illumination). Not only will this procedure insure immunity from earthshine effects but it will also provide a well behaved threshold level to insure against other geometric effects that may change the effective intensity of the sun.

It is readily apparent, in FIG. 8, that all of the sensing elements 17 within a given coverage circle (effective plane) have their associated photocells 27 connected in an electrical parallelism (with each other) to a first common threshold circuit 29. In a like manner, the associated photocells of the sensing elements 15 are electrically connected in parallel to a second common threshold circuit 29a; the associated photocells of the sensing elements 13 are electrically connected in parallel to a third common threshold circuit 29b; the associated photocells of the sensing elements 11 are electrically connected in parallel to a fourth common threshold circuit 29c; the associated photocells of the sensing elements 9 are electrically connected in parallel to a fifth common threshold circuit 29d; and the associated photocells of the sensing elements 7 are electrically connected in parallel to a sixth common threshold circuit 29e. Thus, regardless of which quadrant, within a given coverage circle, is being subjected to solar illumination there will always be a photocell output signal 47 to each of the threshold circuits 29, 29a, 29b, 29c, 29d and 29e.

The sensing elements 5 serve to identify which quadrant of the coverage circle is being crossed by a line passing between the center of the sun and the center of the satellite whose attitude is being determined. This quadrant identification is effected by connecting the associated photocells of three of the sensing elements 5, within a common coverage circle, to separate threshold circuits 29f, 29g and 29h. The associated photocells of all the sensing elements 3, within a given coverage circle, are electrically connected in parallel (with each other) to the threshold circuits 29, 29a, 29b, 29c, 29d, 29e, 29f, 29g, and 29h in order to provide a reference, or threshold, signal thereto.

Instead of connecting three of the sensing elements 5 to separate threshold circuits an alternate arrangement for quadrant identification may be utilized by the addition of another optical sensing element. In this alternate arrangement the added sensing element would be unmasked for half of the coverage circle and completely masked for half of the said coverage circle. The sensing element 5 would have to be alternately completely masked and unmasked in each of the quadrants of the coverage circle.

Thus, in the first quadrant the sensing element 5 and the added sensing element would be completely unmasked (except for reference masks). In the second quadrant the sensing element 5 would be completely masked and the added sensing element would be unmasked. In the third quadrant the added sensing element would be completely masked and the sensing element 5 would be unmasked. In the fourth quadrant either the sensing element 5 and the new element would both be completely masked or both said elements could be completely eliminated.

It should be apparent that the sensing elements, and their electrical interconnections, in any given coverage circle correspond exactly to the sensing elements in any other coverage circle. The only difference between each of the three coverage circles resides in the placing of the attitude encoders in different positions on the satellite for each of the different coverage circles.

It should be noted at this point that different masking than that employed in "Gray code" sequence can be utilized in the identification process. For example, pure binary code identification masking can be utilized to provide usable results. However, when the "Gray code" is utilized there will be only one transition (masked to unmasked or vice-versa) on only one of the sensing elements 3 through 15 between any of the precision angle mark masks transitions on the sensing element 17. This reduces the difficulty of reading out the precision angle from the telemetered data received at the ground station.

It was stated hereinabove that the coverage of the solar attitude encoder quadrants 1 would be explained in greater detail. As best seen in FIG. 9, the solar attitude encoder quadrants 1 are mounted on a satellite 83 in what is effectively three mutually orthogonal planes. Each of four encoders 1 is mounted in one distinct quadrant of one of said orthogonal planes; the four encoders 1 each cover a different 90° of arc making up a total 360° of arc coverage, or a complete circle. There are eight encoders 1 mounted in the remaining two orthogonal planes in the same manner as the encoders 1 are mounted in said first mentioned orthogonal plane. The term effectively was used above in describing the three orthogonal planes because the encoders 1 comprised in any particular effective plane need not lie in the same plane but must lie in parallel planes. It will be recalled that the attitude of a satellite relative to the sun is what is being measured. Accordingly, across of the relatively great distance from the sun to the satellite, the encoders 1 will appear to the sun as lying in a single plane if they lie in parallel planes. Likewise, the sensing elements 3 through 17 will also appear (to the sun) to lie in a single plane, and this should be borne in mind when considering the action of rays from the sun which are oblique to the cylindrical axis of the solar attitude encoder quadrant 1, particularly in connection with the 45° oblique angle coverage discussed hereinabove.

It is well-known that the attitude of an object is completely determined by knowing its angular position in each of two mutually orthogonal planes. The reason for acquiring encoders in three mutually orthogonal planes is purely a matter of coverage. The oblique coverage within each mutually orthogonal plane is effectively limited to 45°. If only two orthogonal planes were utilized there would be times when only one of the planes would effectively "see" the sun. The use of three orthogonal planes results in some overlapping coverage, but it also provides continuous coverage over the face of a sphere.

While the use of the solar attitude encoders, by themselves, is sufficient to define the vector direction of the sun in satellite coordinates (the attitude of a satellite), rotation around the vector line is indeterminate and some other reference direction is needed to completely define orientation. Vector magnetometers (which are well-known in the art) may be used to provide the needed reference direction. Alternately, if the data from the solar attitude encoders is precise enough and dense enough the orientation of the satellite may be derived utilizing the additional information of the inertial properties of the satellite.

The geometry of coverage can be thought of as corresponding to the faces of a tube as seen from its center. Each face can be visualized as having mutually orthogonal precision angle identification mark masks, and each encoder quadrant 1 can be visualized as corresponding to coverage of one face of the tube. In this regard, it should be noted that the cylindrical surfaces of each of the optical sensing elements, such as the element 17, might be made planar and that the precision angle mark masks would no longer be evenly spaced as shown on the precision angle optical sensing elements 17a of FIG. 2a and the optical elements 3a, 5a, 7a, 9a, 11a, 13a, 15a, and 17a of FIG. 3a.

The reason for the lack of even spacing between successive masks when they are applied to a planar surface is because they are radially projected from a cylindrical surface to a planar surface as shown in FIG. 7. When a planar surface having radially projected masks thereon is employed the edge locations of said masks will correspond to a tangent function of the angle being measured.

It can readily be seen that many variations and modifications of the present invention are possible in the light of the aforementioned teachings and it will be apparent to those skilled in the art that various changes in form and arrangement of components may be made to suit requirements without departing from the spirit and scope of the invention. It is therefore to be understood that within the scope of the appended claims the instant invention may be practised in a manner otherwise than is specifically described herein.

What is claimed is:

1. In an attitude encoder for detecting the relative attitude of an object with respect to a light source, the combination including:
   a base mounted on said object and occupying a space remote from said light source,
   a plurality of precision angle optical sensing elements mounted on said base in at least two mutually orthogonal effective planes for receiving directional illumination from said light source,
   means associated with said plurality of precision angle optical sensing elements for accurately determining changes in attitude between said object and said light source,
   a plurality of transducers each connected to one of said precision angle optical sensing elements for providing output signals in response to illumination,
   a plurality of masks disposed about one surface of each of said precision angle optical sensing elements for responding to changes in the relative attitude of said object with respect to said light source by cyclically illuminating its associated transducer thereby causing cyclical changes in the output signal of that transducer if said relative attitude should change; and
   means for identifying which of said plurality of masks caused a particular one of said cyclical changes, thereby providing separation of the functions of accuracy and identification.

2. The invention as recited in claim 1, wherein said precision angle optical sensing elements are mounted on said base in each of three mutually orthogonal effective planes.

3. The invention as recited in claim 2, wherein the area of the masked portion of the masked surface of each of said precision optical sensing elements is substantially equal to the area of the unmasked portion of said surface.

4. The invention as set forth in claim 1, additionally including:
   means for providing reference signals in response to illumination, and
   first means connected to said transducers and said reference signal producing means for comparing said reference signals with said transducer output signals.

5. The invention as recited in claim 4, wherein said mask identifying means include a plurality of optical sensing elements having masking thereon in a coded sequence.

6. The invention as set forth in claim 2, additionally including:
   means for providing reference signals in response to illumination, and
   first comparing means connected to said transducers and said reference signal producing means for comparing said reference signals with said transducer output signals.

7. The invention as recited in claim 6, wherein said mask identifying means includes a plurality of optical sensing elements having masking thereon in a coded sequence, and said comparing means divides said reference signals in half prior to comparison with said transducer output signals.

8. The invention as set forth in claim 7, wherein the masked area of the masked surface of each of the optical sensing elements is substantially equal to the area of the unmasked portion of said surface.

9. The invention as recited in claim 8, wherein one of said mask identification means is mounted on said base within each of the quadrants of each said effective plane.

10. The invention according to claim 9, additionally including:
   a plurality of transducers each connected to one of said optical sensing elements, and
   second comparing means connected to said optical sensing element transducers and said reference signal producing means for comparing the output signals thereof.

11. The invention as recited in claim 10, wherein said second comparing means includes:
first threshold circuits, one of said first threshold circuits being connected to a first group of transducers in each said effective plane,
second threshold circuits, one of said second threshold circuits being connected to a second group of transducers in each said effective plane,
third threshold circuits one of said third threshold circuits being connected to a third group of transducers in each said effective plane,
fourth threshold circuits, one of said fourth threshold circuits being connected to a fourth group of transducers in each said effective plane,
fifth threshold circuits, one of said fifth threshold circuits being connected to a fifth group of transducers in each said effective plane, and
sixth threshold circuits, one of said sixth threshold circuits being connected to each of a sixth group of transducers in each said effective plane.

12. An apparatus for detecting the relative attitude of a satellite with respect to the sun, the combination including:
a plurality of precision angle optical sensing elements mounted on a satellite which occupies a space remote from the sun, said precision angle optical sensing elements being mounted in at least two mutually orthogonal effective planes and serving to receive directional illumination from the sun,
means associated with said plurality of precision angle optical sensing elements for accurately determining changes in attitude between said satellite and the sun,
sensing means connected to each of said precision angle optical sensing elements for receiving illumination therefrom and providing electrical output signals in response thereto,
means associated with each of the sensing means for responding to changes in the relative attitude of said satellite with respect to the sun by cyclically illuminating its associated sensing means thereby causing cyclical changes in the output signal of that sensing means if said relative attitude should change,
means for providing reference signals indicative of full solar illumination,
means connected to each of said output signal producing means and to said reference signal producing means for comparing said output signals with said reference signals thereby providing an output signal corresponding to changes in the attitude of said satellite with respect to the sun, and
means for identifying angle determinations of said precision angle optical sensing elements.

13. The invention as set forth in claim 12, wherein said comparing means divides said reference signals in half prior to comparison with said first-mentioned output signals thereby minimizing the effects of earthshine.

14. The invention as recited in claim 13, wherein said precision angle optical sensing elements each include a plurality of masks disposed about one of their surfaces, said masks forming said means for responding to changes in the relative attitude of the satellite with respect to the sun.

15. The invention as recited in claim 14, wherein the masked area of the masked surface of each of said precision angle optical sensing elements is equal to the unmasked area thereof.

16. The invention as related in claim 15, wherein said angle identifying means includes a plurality of optical sensing elements having masking thereon in a coded sequence.

17. The invention of claim 16, wherein the masked area of the masked surface of each of the angle identification optical sensing elements is substantially equal to the unmasked area thereof.

18. The invention as set forth in claim 17, wherein each of said precision angle sensing elements and each of said angle identification sensing elements include a pair of reference masks on one of their surfaces.

19. The invention as recited in claim 18, wherein one of said precision angle optical sensing elements is mounted on said satellite in each of the quadrants of three mutually orthogonal planes.

References Cited

UNITED STATES PATENTS

| | | | |
|---|---|---|---|
| 2,828,930 | 4/1958 | Herbold | 250—208 X |
| 2,949,536 | 8/1960 | Langton | 250—203 X |
| 3,030,513 | 4/1962 | Bayliss et al. | 250—208 |
| 3,304,028 | 2/1967 | Dryden | 244—1 |

ROBERT SEGAL, *Primary Examiner.*

U.S. Cl. X.R.

33—61; 250—203, 237